United States Patent
Mayer et al.

(10) Patent No.: US 10,684,999 B2
(45) Date of Patent: Jun. 16, 2020

(54) MULTI-PROCEDURE SUPPORT IN DATA MIGRATION

(71) Applicant: SAP SE, Walldorf (DE)

(72) Inventors: Martin Mayer, Heidelberg (DE); Juergen Specht, Gerabronn (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 440 days.

(21) Appl. No.: 15/285,745

(22) Filed: Oct. 5, 2016

(65) Prior Publication Data
US 2018/0095953 A1    Apr. 5, 2018

(51) Int. Cl.
*G06F 16/21* (2019.01)
*G06F 8/656* (2018.01)

(52) U.S. Cl.
CPC .......... *G06F 16/214* (2019.01); *G06F 8/656* (2018.02)

(58) Field of Classification Search
CPC .... G06F 17/303; G06F 16/119; G06F 16/214; G06F 8/656
See application file for complete search history.

(56) References Cited

U.S. PATENT DOCUMENTS

| | | | |
|---|---|---|---|
| 5,717,924 A * | 2/1998 | Kawai | G06F 17/30595 |
| 6,996,589 B1 * | 2/2006 | Jayaram | G06F 17/30569 |
| 7,523,142 B2 * | 4/2009 | Driesen | G06F 16/20 |
| 7,657,575 B2 | 2/2010 | Eberlein et al. | |
| 7,720,992 B2 | 5/2010 | Brendle et al. | |
| 7,734,648 B2 | 6/2010 | Eberlein | |
| 7,739,387 B2 | 6/2010 | Eberlein et al. | |
| 7,962,920 B2 | 6/2011 | Gabriel et al. | |
| 7,971,209 B2 | 6/2011 | Eberlein et al. | |
| 8,126,919 B2 | 2/2012 | Eberlein | |
| 8,200,634 B2 | 6/2012 | Driesen et al. | |
| 8,225,303 B2 | 7/2012 | Wagner et al. | |
| 8,250,135 B2 | 8/2012 | Driesen et al. | |
| 8,291,038 B2 | 10/2012 | Driesen | |
| 8,301,610 B2 | 10/2012 | Driesen et al. | |
| 8,356,010 B2 | 1/2013 | Driesen | |
| 8,375,130 B2 | 2/2013 | Eberlein et al. | |
| 8,380,667 B2 | 2/2013 | Driesen | |
| 8,402,086 B2 | 3/2013 | Driesen et al. | |
| 8,407,297 B2 | 3/2013 | Schmidt-Karaca et al. | |

(Continued)

OTHER PUBLICATIONS

Wikipedia, Object-oriented programming, https://web.archive.org/web/20050318051820/https://en.wikipedia.org/wiki/Object-oriented programming, Mar. 18, 2005, 14 pp. (Year: 2005).*

*Primary Examiner* — Marc S Somers
(74) *Attorney, Agent, or Firm* — Fish & Richardson P.C.

(57) ABSTRACT

Methods, systems, and computer-readable storage media for data migration in a maintenance procedure executed on a software system include actions of initiating the maintenance procedure, and determining that an instance of a data migration object is included in a list of deployed transport objects, and in response: reading a migration class from the data migration object, determining at least one table of a database that is affected by the maintenance procedure based on one or more methods of a first interface of the migration class, receiving, using a second interface of the migration class, data migration logic including computer-executable instructions to migrate data, and executing the data migration logic to affect the at least one table.

20 Claims, 7 Drawing Sheets

(56) References Cited

U.S. PATENT DOCUMENTS

| | | | |
|---|---|---|---|
| 8,434,060 B2 | 4/2013 | Driesen et al. |
| 8,392,573 B2 | 5/2013 | Lehr et al. |
| 8,467,817 B2 | 6/2013 | Said et al. |
| 8,473,942 B2 | 6/2013 | Heidel et al. |
| 8,479,187 B2 | 7/2013 | Driesen et al. |
| 8,555,249 B2 | 10/2013 | Demant et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,868,582 B2 | 10/2014 | Fitzer et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,857 B2 | 5/2015 | Becker et al. |
| 9,031,910 B2 | 5/2015 | Driesen |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,274,757 B2 | 3/2016 | Said et al. |
| 9,275,120 B2 | 6/2016 | Mayer et al. |
| 2003/0221022 A1* | 11/2003 | Sexton ............ G06F 9/445 719/321 |
| 2007/0239774 A1* | 10/2007 | Bodily ............ G06F 17/303 |
| 2010/0153341 A1 | 6/2010 | Driesen et al. |
| 2012/0265726 A1* | 10/2012 | Padmanabhan ...... G06F 17/303 707/602 |
| 2014/0157252 A1* | 6/2014 | Weckwerth ............ G06F 8/65 717/171 |
| 2014/0359594 A1 | 12/2014 | Erbe et al. |
| 2016/0085777 A1* | 3/2016 | Engelko ............ G06F 16/211 707/803 |
| 2017/0046199 A1* | 2/2017 | Kramer ............ G06F 9/4856 |

* cited by examiner

MULTI-PROCEDURE SUPPORT IN DATA MIGRATION

BACKGROUND

Entities, such as software developers and/or vendors, provide software and services. Example software can include enterprise software. In some examples, enterprise software can include application software (an application) that interacts with one or more databases. For example, an application can be hosted on one or more application servers and a user can interact with the application using a client device. In some examples, user interaction can result in data being read from, written to, and/or modified within one or more databases.

During a lifecycle of the application and/or database, one or more maintenance operations may be required. Example maintenance operations include upgrading, configuring, patching, and testing. In order to perform such maintenance procedures, the application and/or database may be taken offline, such that users are unable to interact with the application and/or database, which is referred to as downtime. Although software providers have strived to minimize downtime, achieving zero downtime during such maintenance procedures has been an elusive goal. Further, some maintenance procedures have required, for example, copying of data to separate databases, which can require additional resources (e.g., computer processing, memory).

SUMMARY

Implementations of the present disclosure include computer-implemented methods for data migration in a maintenance procedure executed on a software system. In some implementations, actions include initiating the maintenance procedure, and determining that an instance of a data migration object is included in a list of deployed transport objects, and in response: reading a migration class from the data migration object, determining at least one table of a database that is affected by the maintenance procedure based on one or more methods of a first interface of the migration class, receiving, using a second interface of the migration class, data migration logic including computer-executable instructions to migrate data, and executing the data migration logic to affect the at least one table. Other implementations of this aspect include corresponding systems, apparatus, and computer programs, configured to perform the actions of the methods, encoded on computer storage devices.

These and other implementations can each optionally include one or more of the following features: one or more of a release transport and a patch transport are deployed to an application server, from which the migration class is provided; the data migration logic includes code generator logic that is executable to generate migration code that is specific to the maintenance procedure; executing the data migration logic to affect the at least one table includes converting a structure of the table from an original structure to a target structure; executing the data migration logic to affect the at least one table includes providing a clone table that includes content of the at least one table; the maintenance procedure includes an upgrade procedure; and the data migration object includes an execute class after import (XCLA) object.

Implementations of the present disclosure provide one or more of the following example advantages. In some examples, implementations of the present disclosure enable a data migration mechanism to be defined, which can be used in different upgrade and migration procedures with a different focus on optimization. In some examples, the same mechanism can be executed in a standard delta deployment fully running in downtime with a single process, and can be executed using a parallelization framework, which optimizes system resource usage and migration task to minimize overall runtime. Additionally, the mechanism can be integrated into a data migration procedure, migrating the data from one database instance (and database type) to another database instance (and database type). In some examples, the mechanism can be integrated into zero downtime upgrade procedures based on online data migration in database triggers, or data migration using "record-replay." Implementations of the present disclosure minimize the effort for a developer of the data migration mechanism, who otherwise would have to provide several different mechanisms. In accordance with implementations of the present disclosure, a single data migration mechanism is used by several frameworks in different procedures to optimize on different parameters (e.g. minimal system resource usage, minimal runtime with maximum system resource usage, execution in a database trigger, execution in an application server in the context of a record and replay procedure).

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to multi-procedure support in data migrations. More particularly, implementations of the present disclosure are directed to using a migration class to provide methods (e.g., defining behavior of data objects) including data migration logic, and methods returning code fragments for a code generator, and generating procedure-specific migration code. In some implementations, actions include initiating the maintenance procedure, and determining that an instance of a data migration object is included in a list of deployed transport objects, and in response: reading a migration class from the data migration object, determining at least one table of a database that is affected by the maintenance procedure based on one or more methods of a first interface of the migration class, receiving, using a second interface of the migration class, data migration logic including computer-executable instructions to migrate data, and executing the data migration logic to affect the at least one table.

Figure 1:
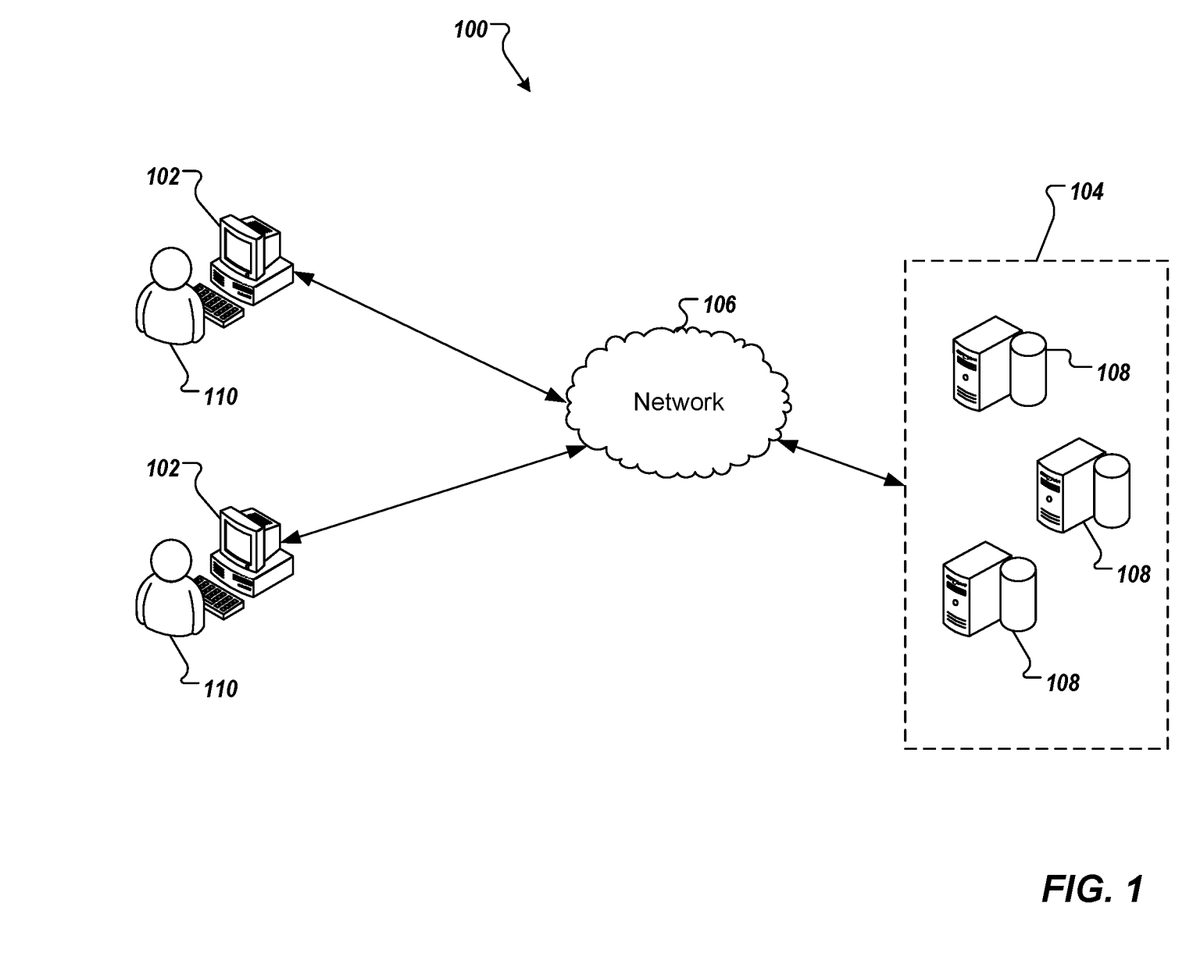
FIG. 1 depicts an example high-level architecture in accordance with implementations of the present disclosure.

FIG. 1 depicts an example architecture 100 in accordance with implementations of the present disclosure. In the depicted example, the example architecture 100 includes one or more client devices 102, a server system 104 and a network 106. The server system 104 includes one or more server devices 108. In the depicted example, respective users 110 interact with the client devices 102. In an example context, a user 108 can include a user, who interacts with an application that is hosted by the server system 104. In another example context, a user 108 can include a user, who interacts with the server system 104 to perform one or more maintenance procedures, described in further detail herein.

In some examples, the client devices 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client devices 102) over the network 106.

In some implementations, one or more data stores of the server system 104 store one or more databases. In some examples, a database can be provided as an in-memory database. In some examples, an in-memory database is a database management system that uses main memory for data storage. In some examples, main memory includes random access memory (RAM) that communicates with one or more processors, e.g., central processing units (CPUs), over a memory bus. An in-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases.

Implementations of the present disclosure are described in further detail herein with reference to an example context. The example context includes applications that are executed on a client-server architecture, such as the example architecture 100 of FIG. 1. In some examples, applications can be provided in a suite that includes two or more applications. Example applications can include an enterprise resource planning (ERP) application, a customer relationship management (CRM) application, a supply chain management (SCM) application, and a product lifecycle management (PLM) application. It is contemplated, however, that implementations of the present disclosure can be realized in any appropriate context (e.g., healthcare applications).

Referring again to FIG. 1, and in the example context, one or more applications can be hosted by the server system 104. A user 110 can interact with an application using the client device 102. More specifically, a session can be established between the client device 102 and one or more server devices 104, during which session the user 110 is able to interact with one or more applications hosted on the server system 104. The one or more applications can enable the user to interact with data stored in one or more databases. In some examples, interactions can result in data being stored to the database, deleted from the database, and/or edited within the database.

In some implementations, applications and/or databases undergo lifecycle management. In some examples, lifecycle management includes executing one or more maintenance procedures for an application and/or a database. Example maintenance procedures can include an upgrade procedure, a patch procedure, a configuration procedure, and development and testing procedures. Implementations of the present disclosure will be described in further detail herein with reference to an upgrade procedure. An example upgrade procedure can include updating software. For example, an application can be updated from a first version (e.g., V1) to a second version (e.g., V2). Example updates can include adding functionality to the application, and/or structural changes to one or more tables stored in one or more databases. As another example, a database can be updated from a first version (e.g., V1) to a second version (e.g., V2). Example updates can include updating a data schema of the database, which can involve structural changes to one or more tables. In some examples, a data schema (also referred to as database schema) is a data structure that defines how data is to be stored in the database. In some examples, the databases schema can be defined in a formal language that is supported by a database management system (DBMS). In general, a data schema can be described as a catalog that specifies all database objects that can be stored in the database. In some examples, different data schemas (e.g., V1 versus V2) can have different objects with the same object name, but different structures.

As introduced above, the execution of maintenance procedures traditionally results in downtime (e.g., unavailability) of an application and/or database. More particularly, and to provide further context for implementations of the present disclosure, for application servers and/or databases, computer-implemented deploy tools conduct operations to deploy, configure, and/or update an application and/or database as part of one or more maintenance procedures. In some examples, the deploy tools can rely on a certain system state, and execute a sequence of actions, which alter the system. Consequently, during the deployment of a maintenance package (e.g., an upgrade package) to an application server, for example, the system is not in a standard configuration. This can mean, for example, that a table in a database is replaced by a construction of two tables and a database trigger that replicates data from one table to another table. Such a setup, however, does not support deployment of another structural change to the table already being altered, for example. Typically (not using zero downtime), it is not possible to run two deployments (e.g., runtime (V1), target (V2)) at the same time, and they are instead run in a sequence. For example, the second deployment can only be brought online as the first deployment is brought offline.

To provide further context for implementations of the present disclosure, traditionally, maintenance procedures (e.g., upgrade) implement a data migration framework for application-specific activities. An example data migration framework includes the eXecute PRogram After import (XPRA) framework provided by SAP SE of Walldorf, Germany. In some examples, the XPRA framework includes calling a XPRA report after the new code and content is deployed, and the persistency structure is adjusted to the new release. In some examples, application developers can provide individual data migration activities using XPRA reports. In some examples, all deploy procedures are based on the transport infrastructure, and thus, all deploy procedures can execute XPRA reports.

A series of different upgrade and database migration scenarios can be used to respectively optimize different aspects of the deployment. Example scenarios include, without limitation, transport, switch upgrade, near zero downtime upgrade (nZDM), zero downtime upgrade (ZDO), upgrade including migration to another database (DMO), database conversion (e.g., conversion to S/4HANA, provided by SAP SE), and system landscape optimization (SLO). For one or more of these scenarios, it is desirable to run data migration during uptime (e.g., nZDM, ZDM, DMO, database conversion, SLO).

Support for minimizing downtime and zero downtime procedures is not possible with current approaches (e.g., the XPRA framework), which operate with application server logic on the target structure of the database table(s), and the complete content in the table(s). For example, the downtime minimizing approach typically requires the possibility to process a subset of the data, the subset being specified in a second table. As another example, the zero downtime approach require synchronous processing in the same database transaction as the original data is written. Further, current approaches are slower than desired and resource inefficient, because they, for example, processes data multiple times (e.g., first in the generic structure adjustment, then in the application-specific data migration.)

In some examples, the XPRA framework calls an application-defined report (the XPRA report). The XPRA report can execute all statements possible in the subject programming language (e.g., ABAP, provided by SAP SE), and can alter table structures. This approach, however, is not feasible in downtime minimized procedures. For example, database tables being used in production (e.g., live, in a production environment) must not be altered by the upgrade procedure. As another example, for a downtime minimizing procedure, the tables read and written by the XPRA must be managed by cloning, recording changes on the original and replaying on the clone, for example. Consequently, for current downtime minimized procedures, XPRA reports are executed in downtime, for zero downtime procedures they cannot be executed, or the tables the XPRA reports operate on are set to read-only for production use, while the data is copied into a table which is then processed by the XPRA report.

In some examples, for near zero downtime, DMO, and database conversion, downtime minimized migration methods are provided. However, such methods are at least partially procedure-specific. Consequently, the methods cannot be reused in another procedure without a certain part of re-implementation. Additionally, these migration methods cannot be tested in standard transports.

Depending on the start release (e.g., V1) configuration of a customer system, and the demand on minimum downtime, the upgrade from one version of a software installation to a new version can require different procedures. Ideally, the procedures can use the same application-specific migration programs to perform the migration of the data in the upgrade. This would minimize the effort for application development and for testing the procedure. In some examples, multiple different procedure types are supported, for example, execution in downtime, asynchronous execution based on data replicated using record and replay, and synchronous execution within the same database transaction as the data is written by the application. In some examples, execution in downtime is used for relatively small changes, is used if no strict downtime minimization requirements exists, or is used if the procedure does not move the data from one database to another (e.g., deploying a small support package). In some examples, incremental asynchronous execution based on data replicated using record and replay is used if strict downtime minimization requirements exist, or is used if the procedure moves the data from one database to another. In some examples, synchronous execution within the same database transaction as the data is written by the application is used if strict downtime minimization requirements exist, or the procedure does not move the data from one database to another (e.g., upgrading ABAP Business Suite, deploy enhancement packages, deploy support packages).

In some examples, additional logic may be required in the application migration procedure. As one example, a configurable level of parallel execution may be required. As another example, operation(s) on a subset of objects in the persistency may be required. For example, the subset is defined by an external interface (e.g. a change record and replay infrastructure, which populates a pool of data to be processed again, when the original data was changed and the change recorded by the downtime minimized procedure). As another examples, operation(s) on single records in a database trigger for a real-zero downtime procedure may be required, when the migration logic runs within the application transaction modifying the data. As another example, operation(s) can be required on a set of tables, a single table or can be limited on single columns only.

In some examples, a class providing a single record migration (e.g., input interface for the old version, output interface of the new version) will typically be too slow for mass data processing, and the resource overhead is significantly large. Further, and in some examples, such a class can only be used in one runtime (e.g., Java, ABAP, DB), but cannot be used in the application server for one procedure, and in the database trigger for another procedure.

In some examples, for the development of a new version of an application, data migration logic has to be provided to migrate data from the previous product version (e.g., V1) to the new version (e.g., V2). Ideally, a single migration logic can be provided, which can be consumed in different deployment procedures and procedure optimizations. The single migration logic also enables optimizing deployment procedures without the need to re-implement migration logic (e.g., while enabling extension of the migration logic for the new optimization). In some examples, procedures used to deploy a new version of the application, or to migrate data from one database to another, should be independent of the application. In this manner, the procedures can be used for any application. In some examples, an application provides a declaration as to which data needs to be migrated, and which data migration methods to call. In some examples, the procedure to deploy a new version of the application handles a set of different start versions. Depending on the start version, a subset of the migrations are to be executed. It may even be required to provide a new migration logic, which can handle different start version configurations and run different migration logic, depending on the start version.

In general, for all procedures, the parallelization level of one data migration as well as the parallel execution of different data migrations should be managed. Further, to minimize impact on memory consumption, cloning of complete tables should be avoided (e.g., only clone modified fields ("shadow column approach")). In this case, the migration logic can be limited to, for example, "update only" (no insert/delete) and to the shadow columns.

In view of the above context, implementations of the present disclosure provide a data migration framework (e.g., successor framework to XPRA), which enables execution during uptime and management of parallel execution, not only individually for one procedure (e.g., for database conversion only), but for all upgrade procedures. In accordance with implementation of the present disclosure, an eXecute CLass After import (XCLA) framework is provided, which uses classes instead of reports, as described in further detail herein.

In accordance with implementations of the present disclosure, a migration class is defined, which provides methods for data migration logic implemented in a programming language, and methods that return code fragments for a code generator, generating procedure-specific migration code. In some implementations, procedures (e.g., upgrade procedures) are extended to include code generators, reading code fragments from the migration class, providing a procedure-specific, optimized sequence of operations on data, and ensuring no data is lost, or unnecessarily processed multiple times.

In some implementations, a procedure including downtime creates a target structure of the table including application data migration in a single step. In some examples, this can include using an intermediary structure of the table including "shadow fields," and altering the table structure after the migration to the final structure defined by the software package.

In some examples, a downtime minimizing procedure provides the table in the target (or an intermediary) structure, and executes data migration while transferring data from the original table to the target table. In some examples, the data transfer includes detecting changes resulting from application use, and replicating these changes including data migration incrementally, a final migration in downtime. In some examples, the procedure calls application-specific data migration logic implemented in the application server language, or generates data migration code using the code fragments for incremental processing.

In some examples, a zero downtime procedure provides either a clone table ("shadow table") in a target structure (or intermediary structure), or adding clone columns ("shadow columns") to the table to be migrated for those columns being processed by the migration program. In some examples, the procedure generates database triggers using code fragments provided by the migration class, as well as scripts (e.g., SQL scripts). In some examples, the scripts are used to initially populate the shadow table (or shadow columns), and the database trigger operates on data changed in the original table or columns resulting from application use.

In further detail, implementations of the present disclosure provide an object (XCLA object), which can be delivered with the application. In some implementations, the XCLA object is detected by the deployment procedure in the application delivery package, and metadata of the XCLA object is evaluated to determine which migration is to be executed. In some examples, the metadata declares which tables and table fields are to be migrated, and which constraints the migration implements. Example constraints can include, without limitation, works on single records (e.g., insert, update, delete), and updates single records only (e.g., update only).

In some implementations, a properties interface (e.g., XCLA-properties-IF) is defined, which provides metadata about the data migration read by the upgrade procedure (e.g., table, table fields, constraint). In some implementations, a migration interface (e.g., XCLA-migration-IF) is defined, which provides the data migration logic.

In some implementations, deployment tools implementing the procedures are extended to read the metadata from the XCLA object, and configure the procedure. In some examples, configuration can include, without limitation, table(s) to be created as shadow table(s), and field(s) to be created as a shadow field(s). In some implementations, the XCLA framework of the present disclosure generates code to be executed for the data migration, and can retrieve the migration logic different runtime environments: application server, database script and database trigger, the XCLA framework controlling the level of parallelization, the size of database transactions, the size of database table partitions, the size of statement where clauses, the frequency of database table merges, the paging of tables or table partitions, and so on.

Implementations of the present disclosure will be described in further detail herein with reference to an example procedure and example components. The example components include a changed table, here named ACCOUNT, and XCLA object, which instructs the deployment procedure to run a data migration, and provides the metadata needed to configure the data migration (e.g., the name of the table to be migrated and the name of the migration method, here named AccountAddIBANBIC (AAI), and a migration class, providing the application logic to migrate data from the old to the new structure, here named AccountMigrator1 (AM1)). It is contemplated, however, that implementations of the present disclosure can be used in any appropriate procedure using any appropriate components.

Figure 2:
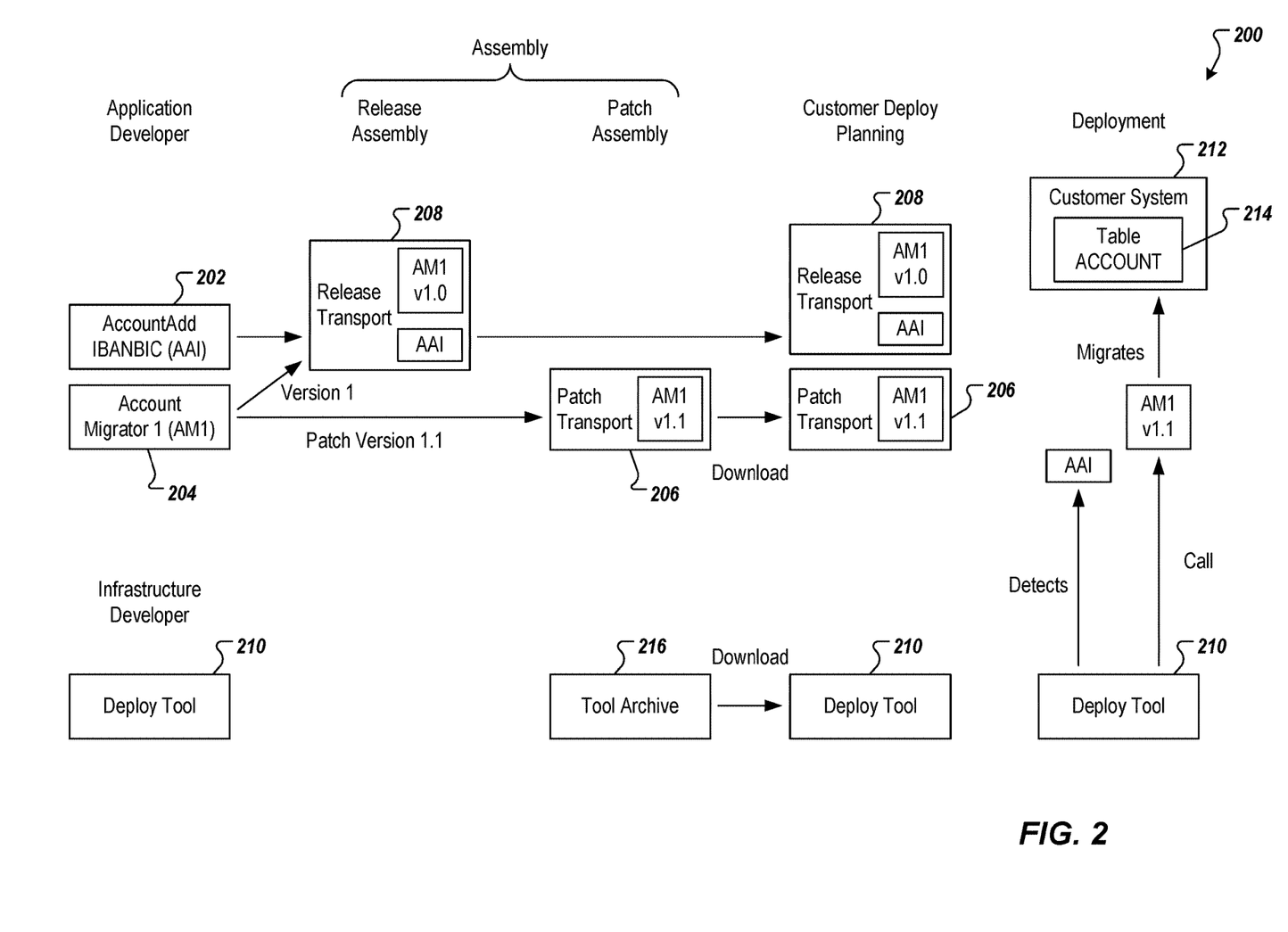
FIG. 2 depicts an example workflow in accordance with implementations of the present disclosure.

FIG. 2 depicts an example workflow 200 in accordance with implementations of the present disclosure. In the depicted example, an application developer creates an AAI instance 202, and an AM1 instance 204. In some examples, each new XCLA instance is registered with the class name. In some examples, the class needs to implement the metadata interface XCLA-properties-IF, where the interface is read to extract which tables are affected (e.g., ACCOUNT). In the depicted example, the AM1 instance 204 (v1.1) is added to a patch transport 206, and the AM1 instance 204 (v1.0) is added to a release transport 208. In some examples, the patch transport 206 and the release transport 208 are provided to a deployment planning system (e.g., for eventual deployment to a customer system (application server and database server)). In some examples, additional metadata can be stored in a workflow administration repository. Example additional metadata can include: name (identifier) of the application developer, creation date, application component and version, test status, performance, average and maximum sizes of table(s) at customer systems, customer feedback about XPRA runtime (e.g., average/maximum, fail rate), and trouble-shooting note(s). In some implementations, a deploy tool 210 is provided, which can be used to execute the procedure (e.g., upgrade procedure) on a customer system 212. An example deploy tool includes the software update manager (SUM) provided by SAP SE.

In some implementations, the XCLA object is provided as a logical transport object. In some examples, it can be determined whether a user (e.g., application developer) has the appropriate authority (e.g., based on user credential and a role assigned to the user) to add the XCLA object to a transport. In some examples, the XCLA object includes information specifying the name of the class that is to execute the data migration logic. In some examples, the name of the transport object instance is equivalent to the class name of the migration class. For example, a user can enter "R3TR, XCLA, <class name>" to the transport (e.g. R3TR XCLA AccountMigrator1).

In some implementations, the migration class uses multiple interfaces: the properties interface (XCLA-properties-IF), and the data migration interface (XCLA-migration-IF). In some examples, the properties interface can be used to retrieve metadata required by the procedures (e.g., the name of the table to be converted). In some examples, the data migration interface is used to provide the data migration logic.

In some implementations, the migrations class (e.g., SAP type specification for a class is R3TR CLAS) is transported together with the XCLA object, or the migration class is transported earlier than the XCLA object. In some examples, the migration class is called during the transport containing the XCLA object. In some implementations, the migration class is imported in a main import step. In some implementations, during execution of an after import method (AIM) (e.g., XPRA/AIM), the XCLA object is read from the respective transport, and the XCLA framework of the present disclosure is executed to run the data migration logic specified by the migration class.

In some implementations, the procedure (e.g., upgrade procedure) is configured to deploy a set of transports. In some examples, a deploy tool (e.g., the deploy tool 210) scans the transports for instances of the XCLA object. In some examples, and depending on the procedure variant configured (e.g., nZDM, ZDM, DMO, database conversion), the XCLA execution is routed to the specific execution framework.

Referring again to FIG. 2, and in some implementations, an infrastructure developer defines the interfaces (e.g., XCLA-properties-IF, XCLA-migration-IF), and provides an abstract implementation of the migration class. In some examples, the migration class can be extended by the application developer. In some examples, the infrastructure developer also defines the XCLA object.

In some implementations, the infrastructure developer provides the deploy tool 210, which can read the deployment archives and look for XCLA objects. In some examples, if a XCLA object is found, the deploy tool 210 reads the deploy tool to identify which migration class to use. In some examples, the deploy tool 210 calls the XCLA-properties-IF to determine which table to operate on, and calls the migration methods of the XCLA-migration-IF.

In some implementations, and as introduced above, the application developer specifies the XCLA object to be used. In the depicted example, the XCLA object is provided as AAI, and it is specified that the class implementing the method is AM1. In some examples, the application developer implements the class AM1, extending the abstract implementation and implementing the interfaces XCLA-properties-IF and XCLA-migration-IF. In some examples, the XCLA-properties-IF indicates that the table ACCOUNT 214 is to be processed.

In some examples, the application developer releases the development objects, which are passed to assembly (e.g., release assembly, patch assembly). In some examples, the assembly creates the release transport 208 (or support-package transport) containing the XCLA object, and the migration class together with the new code of the application and a definition of the table ACCOUNT 214. In some examples, if the application developer creates a patch for the migration class, the patch transport 206 is assembled with the new version.

In some implementations, the assembly publishes the release transport 208, the patch transport 206, and a tool-archive 216 (e.g., to a download area). In some implementations, a user (e.g., a customer administrator) downloads the tool archive and extracts the deploy tool from the tool archive 216. In some examples, the user calls the deploy tool 210, which reads the system software version, and asks the user to define the target version of the software to be downloaded. In some examples, the user provides user input indicating the target version, and the deploy tool 210 identifies the release transport 208 and the patch transport 206 as to-be-downloaded, and downloads both. The deploy tool 210 deploys the release transport 208 and the patch transport 206, as described in further detail herein.

Figure 3A:
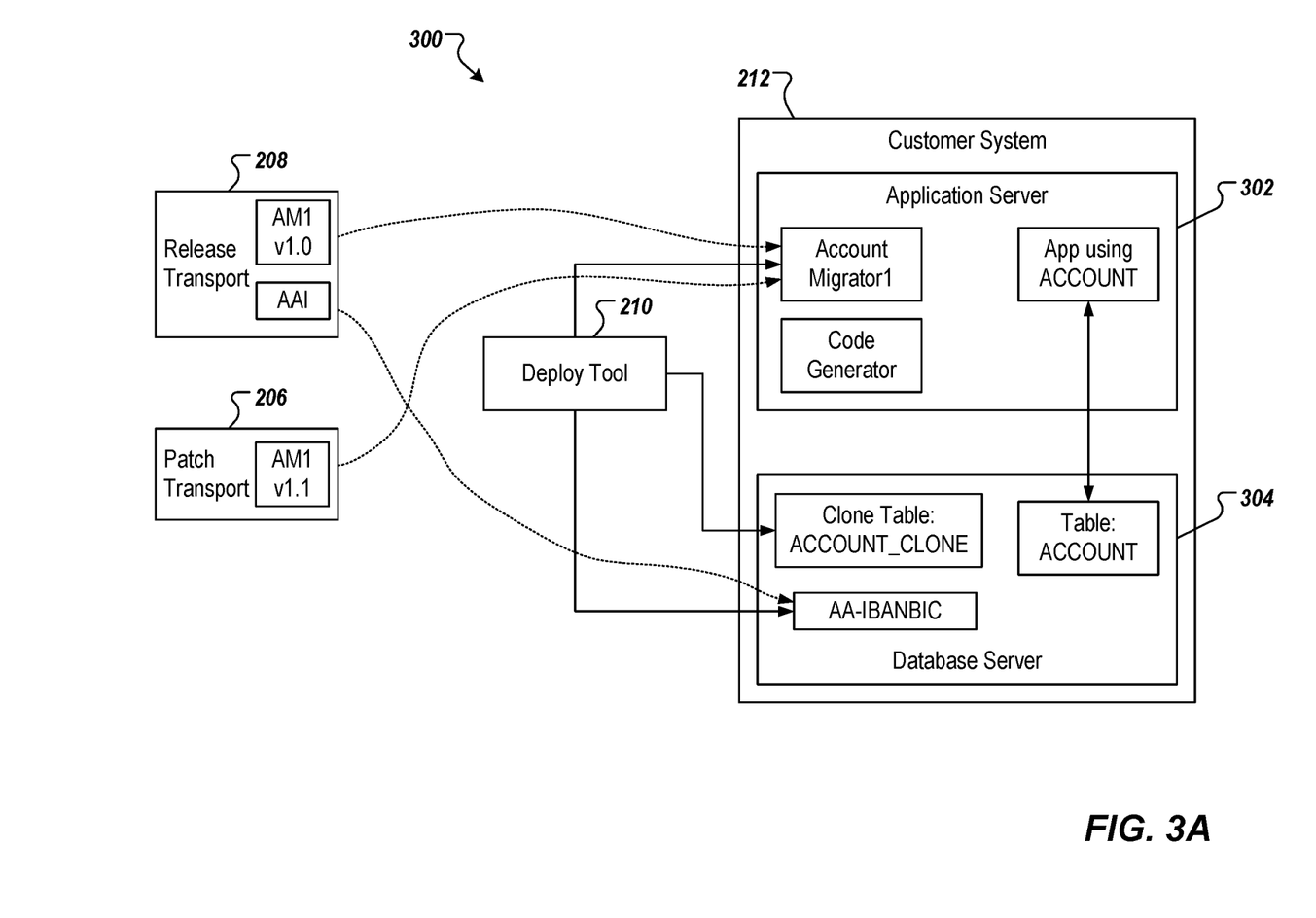
FIGS. 3A-3C schematically depicts an example deployment in accordance with implementations of the present disclosure.
Figure 3B:
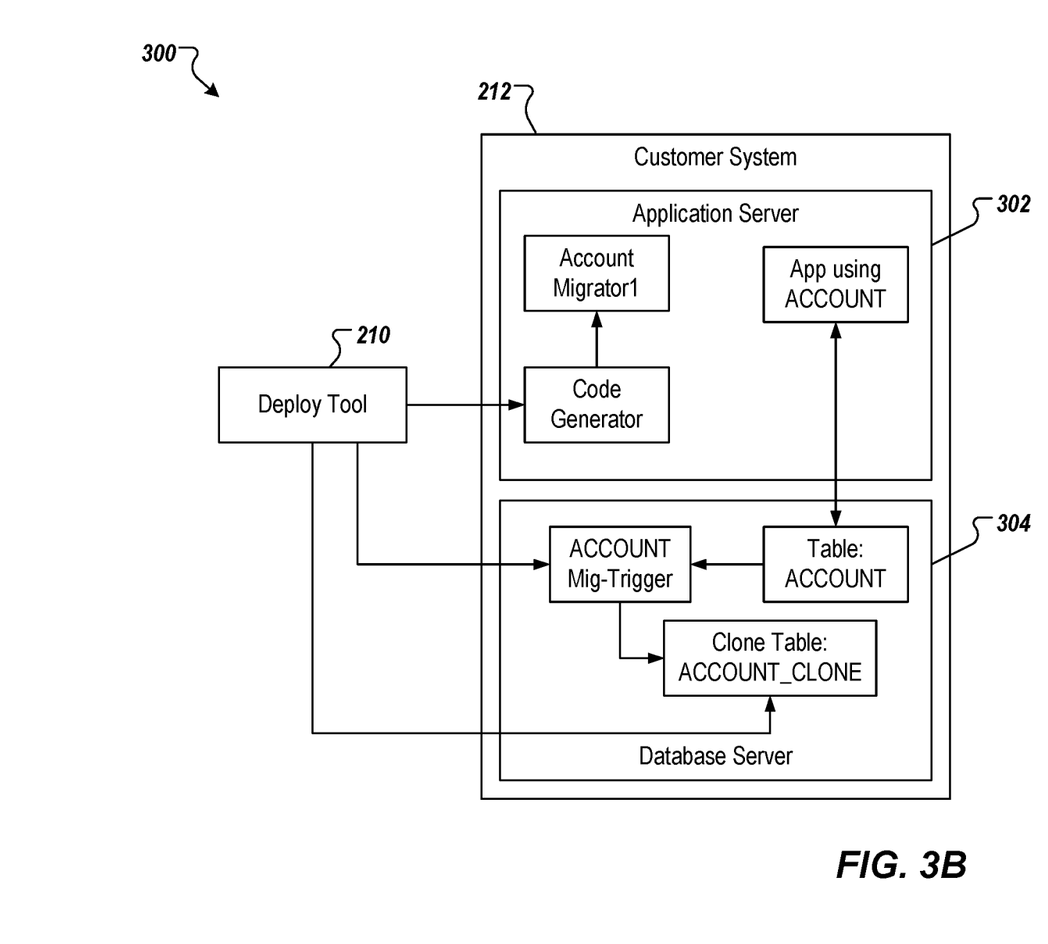
Figure 3C:
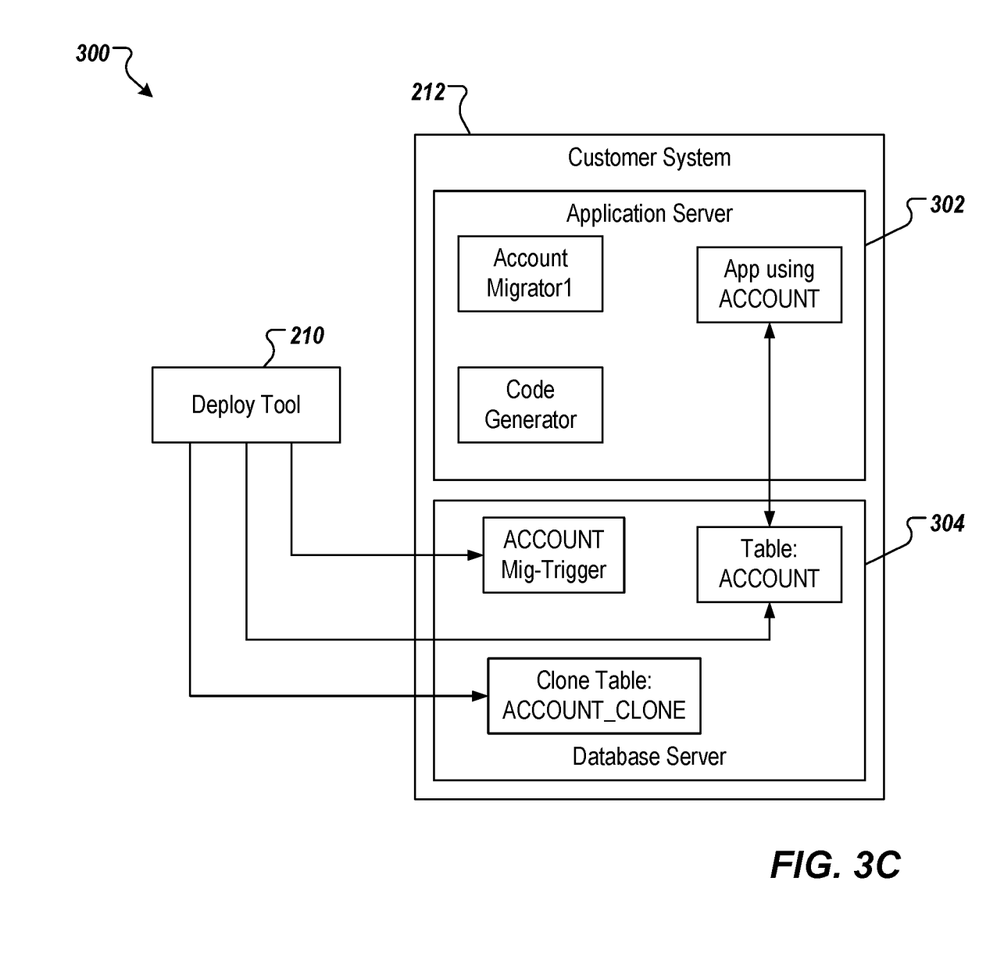

FIGS. 3A-3C schematically depicts an example deployment 300 in accordance with implementations of the present disclosure. In some examples, the deployment 300 is a combination of deployment of the migration code, and the actual migration of the data. In the depicted example, the user (e.g., customer administrator) has defined the deployment package to include the release transport 208 and the patch transport 206, as described above with reference to FIG. 2.

With particular reference to FIG. 3A, the deploy tool deploys the release transport 208, and the patch transport 206. In some examples, the class code (AM1 in version 1.0) is deployed from the release transport 208 to an application server 302 of the customer system 212. In some examples, the XCLA object is written to the database table storing the transport object lists (AAI) in a database server 304 of the customer system 212. In some examples, the class code (AM1 in version 1.1) is deployed from the patch transport 206 to the application server 302.

In some implementations, the deploy tool 210 scans the transport object lists for instances of XCLA. In the depicted example, The instance AccountAdd-IBANBIC (AA-IBAN-BIC) 202 is found. The deploy tool 210 determines which tables are to be migrated. In some examples, the class name is read from the XCLA object definition (e.g., AccountMigrator1). In some examples, the deploy tool 210 calls the table name by calling the methods of the interface XCLA-properties-IF implemented by the migration class (e.g., ACCOUNT), and creates a clone table (e.g., ACCOUNT_CLONE). For example, the deploy tool 210 creates the clone table, and copies the content of the original table to the clone table. In some examples, the deploy tool 210 creates the clone table ACCOUNT_CLONE (with the target structure of the table ACCOUNT). In some examples, the target structure definition of the table ACCOUNT is part of the release transport 208 (and potentially part of the patch transport 206).

With particular reference to FIG. 3B, and in some implementations, the deploy tool 210 calls a code generator in the application server 302 to generate the database trigger code, which is used to create the database trigger (e.g., ACCOUNT Mig-Trigger of FIGS. 3B, 3C). In some examples, the deploy tool 210 provides the name of the migration class, in this example, AccountMigrator1. The code generator creates the trigger code (and the bulk data script code). More particularly, and in this example, the code generator calls the methods of interface XCLA-migration-IF of the class AccountMigrator1 to provide the trigger code. In some examples, the deploy tool 210 provides a trigger ACCOUNT-MIG-Trigger. More particularly, the deploy tool 210 uses the trigger code generated by the code generator to provide the trigger, and provides a bulk copy script. In some examples, the deploy tool call the bulk copy script to copy bulk data from the table ACCOUNT to the clone table ACCOUNT_CLONE.

In some implementations, the application can be used (in production) during the upgrade procedure, while the customer system 212 is in the configuration of FIG. 3B. In some examples, the trigger replicates any changes to the table ACCOUNT, resulting from use of the application, to the clone table ACCOUNT_CLONE.

Referring now to FIG. 3C, upon completion of the upgrade procedure preparations, the deploy tool 210 switches to the target version of the application code and persistency structure. In some examples, the deploy tool 210 drops the trigger. For example, the trigger ACCOUNT-MIG-Trigger is dropped as soon as no user is using the application (e.g., in production) and the application server 302 is stopped. In some examples, the deploy tool 210 drops (e.g., deletes) the table ACCOUNT, and renames the clone table ACCOUNT_CLONE to ACCOUNT. In effect, the clone table replaces the original table. The upgrade procedure is complete.

Figure 4:
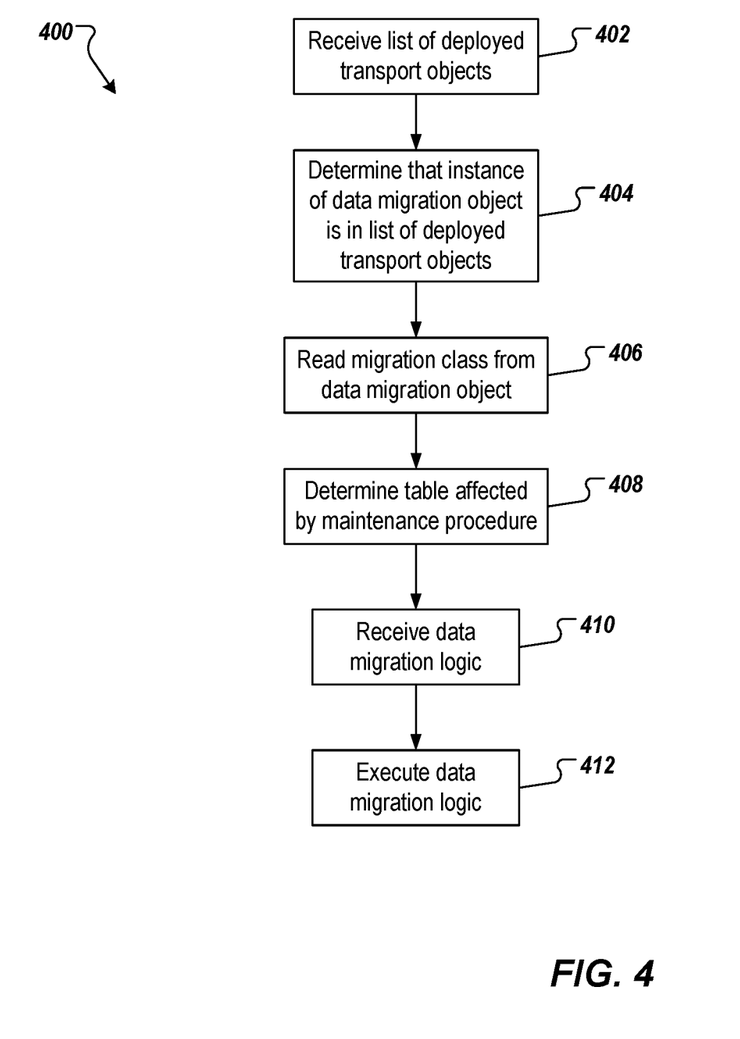
FIG. 4 depicts an example process that can be executed in accordance with implementations of the present disclosure.

FIG. 4 depicts an example process 400 that can be executed in accordance with implementations of the present disclosure. In some examples, the example process 400 can be provided by one or more computer-executable programs executed using one or more computing devices. In some examples, the example process 400 is executed for data migration in a maintenance procedure executed on a software system. For example, the maintenance procedure is initiated, and the example process 400 is executed.

A list of deployed transport objects is received (402). It is determined that an instance of a data migration object is included in the list of deployed transport objects (404). A migration class is read from the data migration object (406). At least one table of a database that is affected by the maintenance procedure is determined (408). For example, the at least one table is identified based on one or more methods of a first interface of the migration class. Data migration logic is received (410). For example, the data migration logic is received using a second interface of the migration class. In some examples, the data migration logic includes computer-executable instructions to migrate data. The data migration logic to affect the at least one table (412).

In some examples, implementations of the present disclosure enable a data migration mechanism to be defined, which can be used in different upgrade and migration procedures with a different focus on optimization. In some examples, the same mechanism can be executed in a standard delta deployment fully running in downtime with a single process, and can be executed using a parallelization framework, which optimizes system resource usage and migration task to minimize overall runtime. Additionally, the mechanism can be integrated into a data migration procedure, migrating the data from one database instance (and database type) to another database instance (and database type). In some examples, the mechanism can be integrated into zero downtime upgrade procedures based on online data migration in database triggers, or data migration using "record-replay." Implementations of the present disclosure minimize the effort for a developer of the data migration mechanism, who otherwise would have to provide several different mechanisms. In accordance with implementations of the present disclosure, a single data migration mechanism is used by several frameworks in different procedures to optimize on different parameters (e.g. minimal system resource usage, minimal runtime with maximum system resource usage, execution in a database trigger, execution in an application server in the context of a record and replay procedure).

Figure 5:
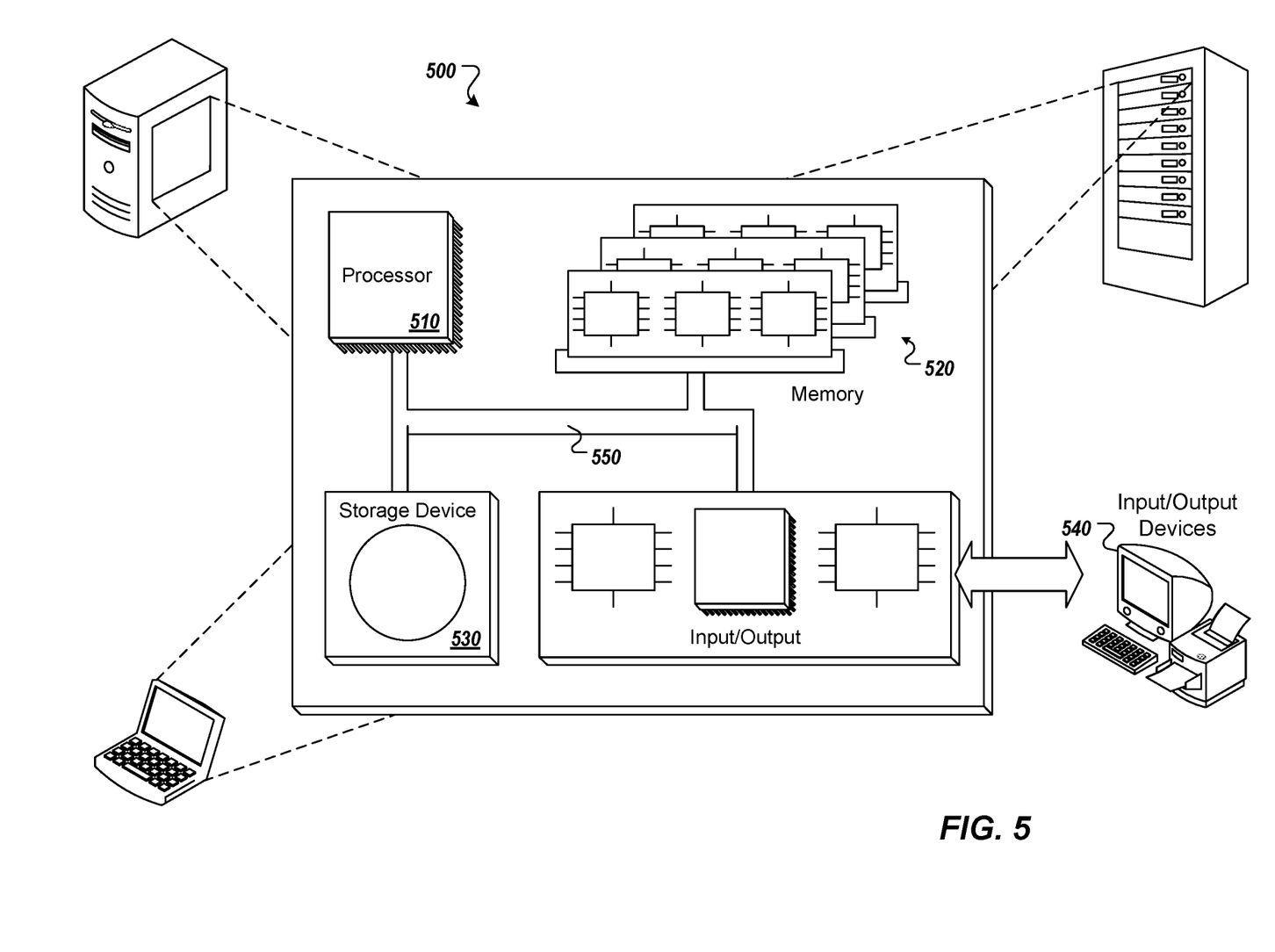
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device), for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include (e.g., a LAN, a WAN), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for data migration in a maintenance procedure executed on an application, the method being executed using one or more processors and comprising:
   initiating, by the one or more processors, the maintenance procedure;
   receiving, by the one or more processors, a transport comprising a list of transport objects and new code of the application; and
   determining, by a deploy tool, that an instance of a data migration object is included in the list of transport objects, and in response:
      routing execution of the data migration object to an execution environment that is specific to a variant of the maintenance procedure,
      reading, by the deploy tool, a migration class from the data migration object,
      determining, by the deploy tool, at least one table of a database that is affected by the maintenance procedure based on one or more methods of a properties interface of the migration class, the properties interface indicating one or more tables affected by the maintenance procedure,
      receiving, by the deploy tool and using a migration interface of the migration class, the migration interface defining data migration logic comprising computer-executable instructions to migrate data, and
      executing, by the deploy tool, the data migration logic during the maintenance procedure to affect the at least one table, the application being in production use during the maintenance procedure.

2. The method of claim 1, wherein one or more of a release transport and a patch transport are deployed to an application server, from which the migration class is provided.

3. The method of claim 1, wherein the data migration logic comprises code generator logic that is executable to generate migration code that is specific to the maintenance procedure.

4. The method of claim 1, wherein executing the data migration logic to affect the at least one table comprises converting a structure of the table from an original structure to a target structure.

5. The method of claim 1, wherein executing the data migration logic to affect the at least one table comprises providing a clone table that includes content of the at least one table.

6. The method of claim 1, wherein the maintenance procedure comprises an upgrade procedure.

7. The method of claim 1, wherein the data migration object comprises an execute class after import (XCLA) object.

8. A non-transitory computer-readable storage medium coupled to one or more processors and having instructions stored thereon which, when executed by the one or more processors, cause the one or more processors to perform operations for data migration in a maintenance procedure executed on an application, the operations comprising:
    initiating the maintenance procedure;
    receiving a transport comprising a list of transport objects and new code of the application; and
    determining, by a deploy tool, that an instance of a data migration object is included in the list of transport objects, and in response:
        routing execution of the data migration object to an execution environment that is specific to a variant of the maintenance procedure,
        reading, by the deploy tool, a migration class from the data migration object,
        determining, by the deploy tool, at least one table of a database that is affected by the maintenance procedure based on one or more methods of a properties interface of the migration class, the properties interface indicating one or more tables affected by the maintenance procedure,
        receiving, by the deploy tool and using a migration interface of the migration class, the migration interface defining data migration logic comprising computer-executable instructions to migrate data, and
        executing, by the deploy tool, the data migration logic during the maintenance procedure to affect the at least one table, the application being in production use during the maintenance procedure.

9. The computer-readable storage medium of claim 8, wherein one or more of a release transport and a patch transport are deployed to an application server, from which the migration class is provided.

10. The computer-readable storage medium of claim 8, wherein the data migration logic comprises code generator logic that is executable to generate migration code that is specific to the maintenance procedure.

11. The computer-readable storage medium of claim 8, wherein executing the data migration logic to affect the at least one table comprises converting a structure of the table from an original structure to a target structure.

12. The computer-readable storage medium of claim 8, wherein executing the data migration logic to affect the at least one table comprises providing a clone table that includes content of the at least one table.

13. The computer-readable storage medium of claim 8, wherein the maintenance procedure comprises an upgrade procedure.

14. The computer-readable storage medium of claim 8, wherein the data migration object comprises an execute class after import (XCLA) object.

15. A system, comprising:
    a computing device; and
    a computer-readable storage device coupled to the computing device and having instructions stored thereon which, when executed by the computing device, cause the computing device to perform operations for data migration in a maintenance procedure executed on an application, the operations comprising:
        initiating the maintenance procedure;
        receiving a transport comprising a list of transport objects and new code of the application; and
        determining, by a deploy tool, that an instance of a data migration object is included in the list of transport objects, and in response:
            routing execution of the data migration object to an execution environment that is specific to a variant of the maintenance procedure,
            reading, by the deploy tool, a migration class from the data migration object,
            determining, by the deploy tool, at least one table of a database that is affected by the maintenance procedure based on one or more methods of a properties interface of the migration class, the properties interface indicating one or more tables affected by the maintenance procedure,
            receiving, by the deploy tool and using a migration interface of the migration class, the migration interface defining data migration logic comprising computer-executable instructions to migrate data, and
            executing, by the deploy tool, the data migration logic during the maintenance procedure to affect the at least one table, the application being in production use during the maintenance procedure.

16. The system of claim 15, wherein one or more of a release transport and a patch transport are deployed to an application server, from which the migration class is provided.

17. The system of claim 15, wherein the data migration logic comprises code generator logic that is executable to generate migration code that is specific to the maintenance procedure.

18. The system of claim 15, wherein executing the data migration logic to affect the at least one table comprises converting a structure of the table from an original structure to a target structure.

19. The system of claim 15, wherein executing the data migration logic to affect the at least one table comprises providing a clone table that includes content of the at least one table.

20. The system of claim 15, wherein the maintenance procedure comprises an upgrade procedure.

* * * * *